(12) United States Patent
Tooth et al.

(10) Patent No.: US 11,389,826 B2
(45) Date of Patent: Jul. 19, 2022

(54) ASSEMBLY AND METHOD FOR PROCESSING A PIPE SECTION FOR A PIPELINE

(71) Applicant: SUSTAINABLE INNOVATIVE TECHNOLOGIES INTERNATIONAL B.V., Europoort Rotterdam (NL)

(72) Inventors: Philip Douglas Tooth, Europoort Rotterdam (NL); John Irving, Europoort Rotterdam (NL)

(73) Assignee: SUSTAINABLE INNOVATIVE TECHNOLOGIES INTERNATIONAL B.V., Europoort Rotterdam (NL)

( * ) Notice: Subject to any disclaimer, the term of this patent is extended or adjusted under 35 U.S.C. 154(b) by 0 days.

(21) Appl. No.: 16/490,888

(22) PCT Filed: Mar. 5, 2018

(86) PCT No.: PCT/EP2018/055385
§ 371 (c)(1),
(2) Date: Sep. 3, 2019

(87) PCT Pub. No.: WO2018/158468
PCT Pub. Date: Sep. 7, 2018

(65) Prior Publication Data
US 2020/0001324 A1    Jan. 2, 2020

(30) Foreign Application Priority Data
Mar. 3, 2017   (NL) ...................................... 2018468

(51) Int. Cl.
*B05D 3/02* (2006.01)
*F16L 55/18* (2006.01)
(Continued)

(52) U.S. Cl.
CPC ............ *B05D 3/0227* (2013.01); *B05B 3/001* (2013.01); *B05B 3/02* (2013.01); *F16L 55/18* (2013.01); *B05D 2254/02* (2013.01)

(58) Field of Classification Search
CPC .. B05D 3/0227; B05D 2254/02; B05B 3/001; B05B 3/02; F16L 55/18
(Continued)

(56) References Cited

U.S. PATENT DOCUMENTS 4,007,705 A *  2/1977  Sherer ................ B05B 13/0436
                                                118/710
4,595,607 A *  6/1986  Betteridge ................ B05C 9/14
                                                118/307
(Continued)

FOREIGN PATENT DOCUMENTS

DE        4123577 C2     9/1996
DE        10020679 A1    11/2001
(Continued)

*Primary Examiner* — Craig M Schneider
*Assistant Examiner* — David R Deal
(74) *Attorney, Agent, or Firm* — AEON Law, PLLC; Adam L. K. Philipp; David V. H. Cohen

(57) ABSTRACT

The invention provides an assembly for processing a pipe section for a pipeline, in particular for coating said pipe section, said assembly having a longitudinal axis which in use functionally coincides with a rotational axis of said pipe section, said assembly comprising a surface-heating device for heating a surface, said surface-heating device comprising at least one heating module, said heating module comprising at least one infrared (IR) radiation laser device, said surface-heating device arranged for projecting a beam of said at least one infrared (IR) radiation laser device at said longitudinal axis for in use heating a ring-section of a surface of said pipe section.

20 Claims, 3 Drawing Sheets

(51) Int. Cl.
   *B05B 3/00*   (2006.01)
   *B05B 3/02*   (2006.01)

(58) Field of Classification Search
   USPC .......................................................... 118/641
   See application file for complete search history.

(56) References Cited

U.S. PATENT DOCUMENTS

| | | | | |
|---|---|---|---|---|
| 5,186,755 | A * | 2/1993 | Carlson, Jr | B05B 13/0436 118/307 |
| 6,397,491 | B1 * | 6/2002 | Gilberti | F26B 3/28 118/642 |
| 6,589,346 | B2 * | 7/2003 | Schick | B05B 13/0484 118/631 |
| 6,881,266 | B1 * | 4/2005 | Daykin | B05B 13/0436 118/305 |
| 8,962,094 | B2 * | 2/2015 | Taylor | B05B 3/14 427/455 |
| 10,780,469 | B2 * | 9/2020 | McRaney | B23K 26/36 |
| 2007/0181541 | A1 * | 8/2007 | Akaba | B23K 26/067 219/121.8 |
| 2009/0272722 | A1 | 11/2009 | Sbetti et al. | |
| 2010/0122972 | A1 * | 5/2010 | Tsubota | B23K 26/0643 219/121.79 |
| 2010/0126972 | A1 | 5/2010 | Kon et al. | |
| 2012/0037297 | A1 * | 2/2012 | Nardo | F16L 13/0272 156/86 |
| 2016/0025256 | A1 * | 1/2016 | George | B05B 13/0421 427/543 |
| 2016/0339487 | A1 * | 11/2016 | Higgins | B23K 26/0006 |

FOREIGN PATENT DOCUMENTS

| | | |
|---|---|---|
| DE | 102010032744 A1 | 2/2012 |
| EP | 0262545 A1 | 4/1988 |
| FR | 2223201 A1 | 10/1974 |
| FR | 2320918 A2 | 3/1977 |
| GB | 1207110 A | 9/1970 |
| WO | 2010130345 A1 | 11/2010 |
| WO | 2013066170 A1 | 5/2013 |
| WO | 2013068460 A1 | 5/2013 |
| WO | 2015010204 A1 | 1/2015 |
| WO | 2015118032 A1 | 8/2015 |
| WO | 2015152726 A1 | 10/2015 |
| WO | 2015161380 A1 | 10/2015 |

* cited by examiner

ASSEMBLY AND METHOD FOR PROCESSING A PIPE SECTION FOR A PIPELINE

FIELD OF THE INVENTION

The invention relates to an assembly and method for processing a pipe section for a pipeline.

BACKGROUND OF THE INVENTION

Processing pipes, pipe ends or parts of pipes together for forming pipelines is known.

For instance as an intermediate or end step in making pipelines, like for instance oil pipelines. Pipe sections are for instance coupled in a process called girth welding. In a girth-welding process, metal pipes or pipe ends are butt-welded together. Next, protective and insulating coating layers are applied to the welded area. The pipe ends already provided with these various coating layers. Often, this coupling is done "in the field", where the pipeline is laid down for instance on a seabed. This process of making "field joints" is known, and done under difficult conditions. On the other hand, the requirements on the quality of the welds and of the subsequently applied coating layers at the joint area are very high, and often these are or need to be certified.

WO2013066170 according to its abstract discloses "an assembly of two pipeline units, wherein each pipeline unit comprises a pipe member and a pipe coating surrounding the pipe member, which pipe member comprises a pipe end, and which pipe coating extends along a length of the pipe member and ends at a coating end face located at a distance from the pipe end, the pipe ends of the pipeline units are joined together at a pipe joint, such that the coating end faces of the pipeline units are located at opposite sides of the pipe joint, a joint coating is provided at the pipe joint, the joint coating surrounds the pipe joint, is attached to the two opposite coating end faces of the pipeline units and is made from a material comprising a silicone."

WO2015152726 according to its abstract discloses "a system for manufacturing a Field Joint Coating, the system comprising: a heating device for heating a quantity of a polymer, an upstream pump for pumping the quantity of heated polymer into a storage compartment of an ejection device, the ejection device which is constructed for each time ejecting the heated polymer from its storage compartment, the ejection device comprising: a barrel which defines the storage compartment, the barrel being reinforced and configured for repeated use, a plunger, an actuator for driving the plunger through the barrel for emptying the storage compartment, a downstream pump, the downstream pump being constructed for increasing the operating pressure of the ejected polymer, a mould configured to be positioned at a field joint around a pipeline."

DE102010032744 in its abstract states: "The subject of the present invention is a method and a device for applying a seal (3) to a surface of a device housing (1, 2) for a motor vehicle. At first, the surface of the device housing (1, 2) is at least partially cleaned and/or microstructured by a heat source (4) bounded in terms of area. Subsequently, a sealant is applied to the thus treated areas of the surface of the device housing (1, 2)."

US2010/126972 in its abstract states: "The present invention provides a method of removing a coated resin layer of a resin-coated metal tube whereby a resin layer can be stripped rapidly without the risk of damaging a plating layer. In a method of removing a coating resin layer of a resin-coated metal tube according to the present invention, a coating resin layer is removed by a rotating body of a rotating body stripping apparatus, whereupon the coating resin layer is removed by a laser beam of a laser apparatus."

DE4123577 in its abstract states: "Laser hardening of martensitic hardenable ferrous metal components to a large hardened depth, esp. solid phase case hardening of rotary, prismatic or spherical functional faces of components, is carried out using a high power (at least 3 kW) laser by relative motion between a shaped laser beam and the component surface. The laser heated surface of the component is exposed to three-dimensional high intensity heat removal, pref. by immersion in and/or spraying with cooling liq., esp. water. USE/ADVANTAGE—Useful for laser hardening of small functional faces of cams, piston rings, camshafts and rotationally symmetrical discs and rollers. It allows deep hardening even of components with small thickness."

Processing pipe sections and in particular making field joints often is relatively time consuming.

SUMMARY OF THE INVENTION

A disadvantage of prior art is that making field joints is time-consuming, but the quality requirements are extremely high, despite the often difficult circumstances.

Hence, it is an aspect of the invention to provide an alternative assembly and method for one of more steps in the process of making field joints. In an aspect of the invention, the assembly or method at least partly obviates one or more of above-described drawbacks.

The invention thus provides an assembly for processing a pipe section for a pipeline, in particular for coating said pipe section, said assembly having a longitudinal axis which in use functionally coincides with a rotational axis of said pipe section, said assembly comprising a surface-heating device for heating a surface, said surface-heating device comprising at least one heating module, said heating module comprising at least one infrared (IR) radiation laser device, said surface-heating device arranged for projecting a beam of said at least one infrared (IR) radiation laser device at said longitudinal axis for in use heating a ring-section of a surface of said pipe section.

The invention further provides a method for processing a pipe section for a pipeline, in particular for coating said pipe section, said method comprising:

pre-treating a surface of said pipe section to provide a surface condition using laser ablation;

heating a surface of said pipe section using at least one infrared laser device, and applying at least one coating composition onto said heated surface.

The current assembly and method relate to processing of a pipeline section different processing steps, including surface-processing, surface heating, coating.

In an embodiment, the assembly and method are applied in or for processing a pipe section in a production process or part of a production process for making a pipeline. In an embodiment, the assembly and method are applied in or for a process for jointing pipe sections or parts of pipe together for forming a pipeline. Such a process can be applied on land or for instance on board of a vessel, or even under a water surface.

In an embodiment, the pipe section to be processed is part of a pipeline for transporting oil or for instance liquid gas. Such a pipeline can have a diameter of 0.3-1.5 meter. Usually, such a pipeline relates to a metal pipe that is coated for protection and/or insulation. Such a coating may be provided at the inside and/or on the outside. In an embodiment, the current assembly and method are applied for processing the outer or outside surface of a pipeline. In an embodiment, such a processing includes providing a coating layer or a coating system.

In an embodiment, the ablation laser comprises focal optics for focusing laser energy onto a surfaces of said pipe section. This ablation laser us usually applied to metal surfaces.

It was found that the at least one IR radiation laser device allows a controlled heating of the surface that further allows inspection and validation.

The coating may comprise one or more layers. In an embodiment, several layers of coating are applied, forming a coating system. These layer should adhere to one another. Often, a coating composition of a polymer material is used. Such a coating composition may comprise a molten polymer material. One or more layers may also or additionally comprise a coating of another material, like a metal deposition, a ceramic deposition, or any other suitable, known coating composition.

The coating may be applied to a freshly produced weld that is for instance made while a pipeline is produces. Alternatively or in combination, the coating may be applied to a repair site or the pipeline, for instance repairing a weld, replacing a weld, making a new weld, or repairing a damaged coating system or insufficient coating system.

It was found that the specific semiconductor light sources provide specific advantages in the area of field joints. The light sources allow a very controlled surface preparation and/or surface heating. This makes it possible to certify each processing step. As explained, several process steps can be involved in making a girth-welded field joint, and in an embodiment in case such a girth-welding assembly of method includes applying a coating layer or coating system on a coupled pipe:

1. Preparing the metal pipe surface for receiving an anti-corrosion layer;
2. Heating the metal pipe surface for adhering a thermosetting anti-corrosion layer of fusion-bonded epoxy;
3. Heating subsequent coating surfaces to the anti-corrosion layer and subsequent coating layers to bond onto and with one another.

In the current context, producing a girth-welded field joint is found to comprise at least some of the following steps.

1. End Preparation of Parent Coating—Offline

Re-profile Cut-Back ends to sound coating, removing risk of Creep disbondment under parent coating ends, and stress fractures during reeling and pipelay.

Synchronise Profile and Field Joint length to profile and fixed dimension of Insulation Segment using 3D Laser metrology.

2. Laser Ablation Cleaning

The steel surface is scanned using an enclosed radial Laser Ablation Array, at an adjustable radius from the steel surface, cleaning a band with a width of 10-200 mm at a typical travel speed of at least 1 metre/minute.

Surface Cleanliness standard equivalent of SA 2.5 is achieved, with an anchor profile of 70-100 microns Rz.

The assembly is mounted in a split frame, for location on and off the pipe when necessary.

Abrasive blast medium, compressed air and vacuum recovery are not used.

3. Laser Preheat of the Steel Surface 3.1 Primary Scan

The cleaned steel surface is scan-preheated to 90° C.-150° C., heating a band with a width of between 10 and 200 mm, powered by a variable output radial laser array, at a typical speed of 1 metre/minute, preheating the steel to the base level from which to begin the heat and coat cycle.

The laser array is in an embodiment controlled by infrared pyrometer and camera.

3.2 Secondary Scan

On reaching the extremity of the field joint, the laser array band dwells momentarily, whilst the steel surface temperature is raised to the a required Fusion-bonded epoxy (FBE) application temperature window of for instance 150° C.-230° C.

Once this temperature is reached the laser array reverses direction and travels back along the field joint towards the starting point, at a power level which maintains the surface temperature during the FBE application.

4. Fusion-Bonded Epoxy (FBE) Application

Simultaneous to the Secondary Scan an anti-corrosion layer of FBE is applied from an integral multi-port injection head and fluidised bed, to a thickness of 200-300 microns, whilst the steel surface remains within the temperature application limits of for instance 150° C.-230° C.

Fusion-bonded Epoxy (FBE) Single Layer Anti-Corrosion Coat

Where FBE is required as a Stand Alone Anti Corrosion Coating, subsequent layers may be applied in sequence with the laser array up to a thickness of 1000 microns, as required by the specification.

5. FBE+Chemically Modified Poypropylene (CMPP) Combined Application

When the laser array and FBE head have passed over the application window, a layer of CMPP adhesive is applied from a second integral injection head and fluidised bed, combining with the wetted FBE surface to form a chemical and mechanical bond with the FBE.

The CMPP head continues to apply the adhesive whilst the surface temperature in an embodiment remains within the application temperature window of 150° C.-200° C.

The application travel speed and dwell distance of the laser array and coating heads is predetermined, so that the sequentially applied combined layer will achieve a thickness of up to 1 mm.

6. CMPP Application

Once the laser array and FBE and CMPP coating heads return to the start point, those application cycles are completed.

When required the CMPP application can continue during additional passes, scanning back and forth over the field joint to build up the PP thickness to up to 6 mm.

The PP surface molten state is maintained by means of additional inter-pass thermal processing from the laser array.

7. Thermal Processing of Parent Coating Interfaces.

At the end of the final CMPP application pass, the laser array heats up to 100 mm of the parent coating at each end of the cutback, to a temperature close to the parent PP melting point (for instance 160° C.), in line with the molten state of the applied CMPP.

8. Thermal Calibration of Applied 3LPP (Hi Build Finishing)

A multi-function calibration tool, with variable temperature control, is installed over the applied 3LPP Field Joint and up to 100 mm of the parent coating, to ensure continuity of interface fusion and design contour, by applying temperature and pressure, followed by integral cooling to allow pipe handling.

9. Thermal Processing of PP Insulation Segments—Offline

The PP Insulation Segments are prefabricated to project specific thermal insulation requirements, with fixed field joint dimensions and profiles that synchronise with the prepared parent coating, confirmed by 3D Laser metrology.

The pre-selected segments are conditioned offline and presented to the installation carousel by conveyor system.

10. Installation of Insulation Segments Inline in Press

The internal face of each segment are heated to installation temperature by replica geometry laser heaters, within a carousel, prior to presentation to the prepared molten Field Joint Surfaces and closed around the pipe by hydraulic press of 25 kN (2.5 Tonnes).

Each segment interface has an integral locating and locking closure to confirm closure on the corresponding field joint interfaces at a fixed distance to accommodate manufacturing tolerances in both the steel pipe and the insulation segment.

During closure, the excess thickness of molten CMPP is pressed out of the inner annulus, through machined exit paths, then showing at the external surface as a verification trail.

11. Thermal Closure/Laser Welding of Segment Seams, Circumferential and Longitudinal Thermal closure of the fixed length segments is achieved by Laser welding of the overlapping geometry of the Longitudinal segment seams, and the Circumferential interface seams, of the prepared parent coating cut back dimensions.

12. Inspection of Completed Field Joint

Interfaces flush with parent coating

Laser Metrology of finished dimensions

Verification Trails

All application data recorded and transmitted.

Furthermore, the heating device allows close process control, allowing certifying each step and the complete process. Furthermore, the heating device allows measurement during the steps in order to allow support for the certification of each process step.

In an embodiment, the heating device comprises a series of said heating modules, positioned around said longitudinal axis. In an embodiment, the series of said heating modules are positioned around said longitudinal axis. In an embodiment, the series of said heating modules are positioned around said longitudinal axis and functionally form a ring around said longitudinal axis, and with their at least one infrared (IR) radiation laser devices arranged for projecting their beams at said longitudinal axis.

In an embodiment, the heating modules are arranged for providing said beams at a regular interspacing.

In an embodiment, each of said at least one heating module comprises a series of infrared (IR) radiation laser devices, directed for projecting their beam at said longitudinal axis.

The IR radiation laser devices can be installed to provide a homogeneous ring of IR radiation onto a pipe section.

In an embodiment, the heating device comprises a heating device actuator for rotating said at least heating module about said longitudinal axis while said beam of said at least one infrared (IR) radiation laser device remains directed to said longitudinal axis. In an embodiment, the heating device actuator is adaptable and/or controllable for setting a rotational speed for providing a predefined heating temperature. In an embodiment the heating device actuator is controllable for setting a rotational speed for providing a homogeneous surface heating. Thus, setting homogeneous heating can be accommodated.

In an embodiment, the heating device comprises a or said series of said heating modules provided as a ring around said longitudinal axis, and said heating device is adapted for allowing changing the number of heating modules for adapting a circumference of said ring setup of said heating modules about said longitudinal axis, for adapting said surface heating device to a diameter of a pipe section to be heated.

In an embodiment, the assembly further comprising an assembly actuator for advancing said heating device along its longitudinal axis, in use longitudinally along said pipe section. In an embodiment, the assembly actuator is controllable for controlling a heating temperature of said surface.

In an embodiment, the infrared radiation laser device comprises a series of semiconductor light sources. In an embodiment. the semiconductor light sources comprise a series of vertical cavity surface emitting lasers.

In an embodiment, the infrared radiation laser device is a collimated laser.

In an embodiment, the heating module comprises at least 10.000 semiconductor light sources for providing said at least one infrared (IR) radiation laser device. In an embodiment, the semiconductor light sources are provided on a regularly spaced matrix.

In an embodiment, the at least one infrared (IR) radiation laser device transmit in an infrared wavelength range of between 800 and 1300 nm.

In an embodiment, the assembly further comprises a control device for controlling an output of said at least one infrared (IR) radiation laser device in each of said heating module for controlling said surface heating.

The heating device may be set for heating for instance in a temperature range of between 50° C. and 300° C.

In an embodiment, the assembly further comprises at least one sensor system for sensing said heated surface. In an embodiment, the sensor system comprises an optical sensor. In an embodiment, the sensor system comprises an optical recording system, comprising at least one camera system, in an embodiment sensitive in the infrared range, for recording an image of at least part of said pipe section surface during said heating of said surface.

In an embodiment, the control device is functionally coupled to said sensor system for in used receiving information regarding said heated surface, and said control system is further adapted for controlling said infrared (IR) radiation laser device in response to said sensor information.

The control device can be functionally coupled to the sensor system, the heating actuators, the assembly actuator and allows control of homogeneity, temperature and heating profile in time and space. Furthermore, data from the sensor system can be logged for traceability and quality control.

In an embodiment, the assembly further comprises a surface-processing device for processing a pipe surface, in particular using ablation, said surface-processing device comprising at least one laser ablation module, said laser ablation module comprising at least one laser ablation device arranged for in use projecting at least one ablation beam at said longitudinal axis for in use ablating said surface of said pipe section.

In an embodiment, the surface processing device comprises a series of said at least one laser ablation devices arranged for in use projecting their ablation beams at said longitudinal axis.

In an embodiment, the surface-processing device comprises a surface-processing actuator for rotating said at least one laser ablation device while maintaining it positioned with its ablation beam directed to said longitudinal axis.

In an embodiment, the at least one laser ablation device comprises a focus actuator of setting a focus as a preselected distance from said longitudinal axis. In an embodiment, the focus actuator is set for adapting said surface-processing device to a diameter of said pipe section.

The control device con be functionally coupled to the focus actuator and to the surface-processing actuator for controlling the ablation process. The sensor system may additionally comprise a camera for allowing imaging in the visual range, or a sensor for measuring a surface property parameter. The sensors can provide data to the control system for controlling, and/or logging the ablation process.

In an embodiment, the assembly further comprises a coating device for coating a surface, said coating device comprising at least one coating application module, said coating application module comprising at least one coating applicator arranged for providing coating composition in direction of said longitudinal axis, said coating device arranged for homogeneous coating of a ring-section of a surface of said pipe section. In an embodiment, the coating applicator comprises at least one spray nozzle arranged for spraying to said longitudinal axis.

In an embodiment, the coating device comprises a series of said coating applicators positioned around said longitudinal axis and arranged for providing coating composition in direction of said longitudinal axis.

In an embodiment, the coating device comprises a ring having an axis coinciding with said longitudinal axis, said ring comprising said at least one coating applicator on an inner surface of said ring.

In an embodiment, the coating device comprises a coating actuator for advancing said at least one coating applicator around said longitudinal axis while maintaining it directed to said longitudinal axis.

In an embodiment, the coating device comprises a coating actuator for rotating said ring about said longitudinal axis.

The control device can be functionally coupled to the coating actuator for controlling the coating process. The sensor system may additionally be provided with a coating property sensor for providing coating property data to the control system.

The control system be comprise a back loop for controlling any of the discussed devices and their operation. The sensor data can be logged for quality assurance and quality control.

In an embodiment, the coating device is positioned adjacent said surface heating device.

In an embodiment, the assembly comprises at least two of said coating devices positioned adjacent said surface-heating device at both sides of said surface-heating device.

In an embodiment of the method, the coating layer forms a first coating layer and has an outer surface, and in said method said outer surface is subsequently heated and a second coating layer is applied on said heated outer surface of said first coating layer.

In an embodiment of the method, comprising application of said assembly for heating said surface of said pipe section and applying said first coating layer.

In an embodiment of the method, in said heating said pipe section surface said assembly advances along said pipe section in a first direction from one longitudinal pipe section position to a second longitudinal pipe section position while said heating device heats a pipe section surface between said first and second longitudinal pipe section position, and advances subsequently in a second, opposite direction while said coating device applies a coating layer.

The current application further relates to an assembly for processing a pipe section for a pipeline, in particular for coating said section, said assembly comprising a surface-processing device for processing a pipe surface, in particular using ablation, said surface-processing device comprising at least one laser ablation module, said laser ablation module comprising at least one laser ablation device arranged for homogeneous illumination of said pipe surface, said surface-processing device arranged for processing a ring-section of said surface of said pipe section.

The current application further relates to assembly for processing a pipe section for a pipeline, in particular for coating said pipe section, said assembly having a longitudinal axis which in use functionally coincides with a rotational axis of said pipe section, said assembly comprising a surface-processing device for processing a pipe surface, in particular using ablation, said surface-processing device comprising at least one laser ablation module, said laser ablation module comprising at least one laser ablation device arranged for in use projecting at least one ablation beam at said longitudinal axis for in use ablating said surface of said pipe section.

The current application further relates to an assembly for processing a pipe section for a pipeline, in particular for coating said section, said assembly comprising a surface-heating device for heating a surface, said surface-heating device comprising at least one heating module, said heating module comprising at least one infrared (IR) radiation laser device arranged for homogeneous illumination of a surface.

The current application further relates to an assembly for processing a pipe section for a pipeline, in particular for coating said section, said assembly comprising a coating device for coating a surface, said coating device comprising at least one coating application module, said coating application module comprising at least one coating device arranged for homogeneous coating of a ring-section of a surface of said pipe section.

The current application further relates to assembly for processing a pipe section for a pipeline, in particular for coating said pipe section, said assembly having a longitudinal axis which in use functionally coincides with a rotational axis of said pipe section, said assembly comprising a coating device for coating a surface, said coating device comprising at least one coating application module, said coating application module comprising at least one coating applicator arranged for providing coating composition in direction of said longitudinal axis, said coating device arranged for homogeneous coating of a ring-section of a surface of said pipe section, in particular said coating applicator comprises at least one spray nozzle arranged for spraying to said longitudinal axis.

The current invention further relates to an assembly for processing a pipe section for a pipeline, in particular for coating said section, said assembly comprising a surface-processing device comprising a laser ablation device, a surface-heating device comprising at least one infrared (IR) radiation laser device arranged for homogeneous illumination of a surface, and a coating device.

The current application further relates to assembly for processing a pipe section for a pipeline, in particular for coating said pipe section, said assembly having a longitudinal axis which in use functionally coincides with a rotational axis of said pipe section, said assembly comprising a surface-processing device comprising a laser ablation device, a surface-heating device comprising at least one infrared (IR) radiation laser device arranged for homogeneous illumination of a surface, and a coating device. In an embodiment, said surface-processing device, said surface-heating device and said coating device mutually aligned with respect to said longitudinal axis.

The pipe section surface can be a metal or steel surface. General, in particular for oil and gas pipelines, properties are well defined. Furthermore, for particular pipelines many properties and specifications are defines. A skilled person knows the particular properties and requirements and can set the current assembly for meeting these requirements.

In particular in gas en oil pipelines for making girth welds in the field ("field joints"), the current assembly and method are particularly suited.

The terms "upstream" and "downstream" relate to an arrangement of items or features relative to the propagation of the light from a light generating means (here the especially the first light source), wherein relative to a first position within a beam of light from the light generating means, a second position in the beam of light closer to the light generating means is "upstream", and a third position within the beam of light further away from the light generating means is "downstream".

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale

DESCRIPTION OF THE PREFERRED EMBODIMENTS

Figure 1:
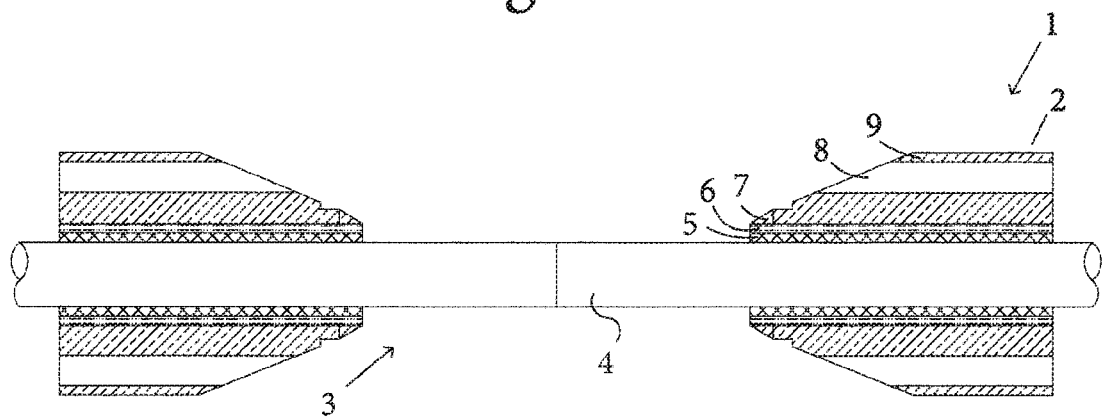
FIG. 1 schematically depicts an embodiment a section of a pipeline with a coating system of various coating layers in cross section.

FIG. 1 schematically depicts parts of a pipeline 1 that is provided with a coating system 2. On a section 3 of the pipeline 2, the coating system 2 has been removed, showing a metal surface 4 of the pipeline. In the centre, in this example, a weld is indicated. The coating system 2 in this example comprises several layers that can be provided for protection against influences of the environment, and/or for insulation.

In the example of FIG. 1, the following layers are applied to the pipe. These layers are indicated as an example of a coating system that may be used.

A corrosion-preventing base layer or base coat 5. Usually, such a layer is applied onto a bare, processed steel surface. Often, a polymer layer is applied. Such a coating layer in an embodiment comprises a two-component coating composition, or even a multi-component coating composition. In such a coating composition and its application, often components reactive components are mixed shortly before application, and the mixed components are sprayed onto a surface. In corrosion preventing layers, often an epoxy-based coating composition is used, but the invention is not limited to this. An example of such a coating composition is a fusion-bonded epoxy layer (FBE) 5.

An intermediate coating layer 6. Such an intermediate coating layer is often applied for providing bonding between the base coat 5 and a mechanical protection layer of a further coating layer. The intermediate coating layer often comprises a single component coating composition. This may be a physically setting coating composition. Alternatively of in combination, such a coating composition can be powder coated, for instance. An example of such an intermediate coating composition is for instance a chemically modifier polypropylene (CMPP) 6. Such a coating composition on the one hand bonds to the base coat 5, and on the other hand provides a good basis for further layers.

A yet a further coating layer 7. Such a coating layer is often applied for mechanically protecting the base coat 5 and provide further protection. A further coating layer often comprises a single component coating composition. This may be a physically setting coating composition. Alternatively of in combination, such a coating composition can be powder coated, for instance. of solid polypropylene (PP) 7. Again, such a coating layer can be for further mechanical protection, This . . .

An insulation layer 8. Such an insulation layer in an embodiment is a relatively thick layer with a high build-up. Such a layer often comprises a foamed polymer layer 8. The radial composition can be homogeneous, but may also vary in radial direction. An example of such a layer can be a layer of foamed polypropylene 8. An insulation layer 8 may be applied in a spraying process. In such a process, a one, two or multi-component coating composition is mixed with a foaming composition, often of liquefied gas or a gas under pressure, just before application. The composition can be sprayed or powder-coated.

An outer layer 9 for further protection of the insulation layer can be applied. This in an embodiment can be a singe component coating composition. of solid polypropylene (PP) 9 covering and sealing the foamed polypropylene 8 . . . .

In an alternative embodiment, one of more of the coating layers may be applied in the form of a strip of material that is would around or about the pipe section.

The coating system above is describes as clearly defined layers. In an embodiment, these layers may also in radial direction, moving away from the pipe surface, gradually change in composition and properties.

In a usual, known process, each of these layers is applied separately. The quality of these layers and the combination is closely monitored. These different coating layers in an embodiment should mutually adhere. Furthermore, for process efficiency, a fast setting is desirable. To that end, surface heating is applied.

The sections of pipe that are to be processed can be a repair that is in progress, or it can be a field joint that is being made, as explained.

Figure 2:
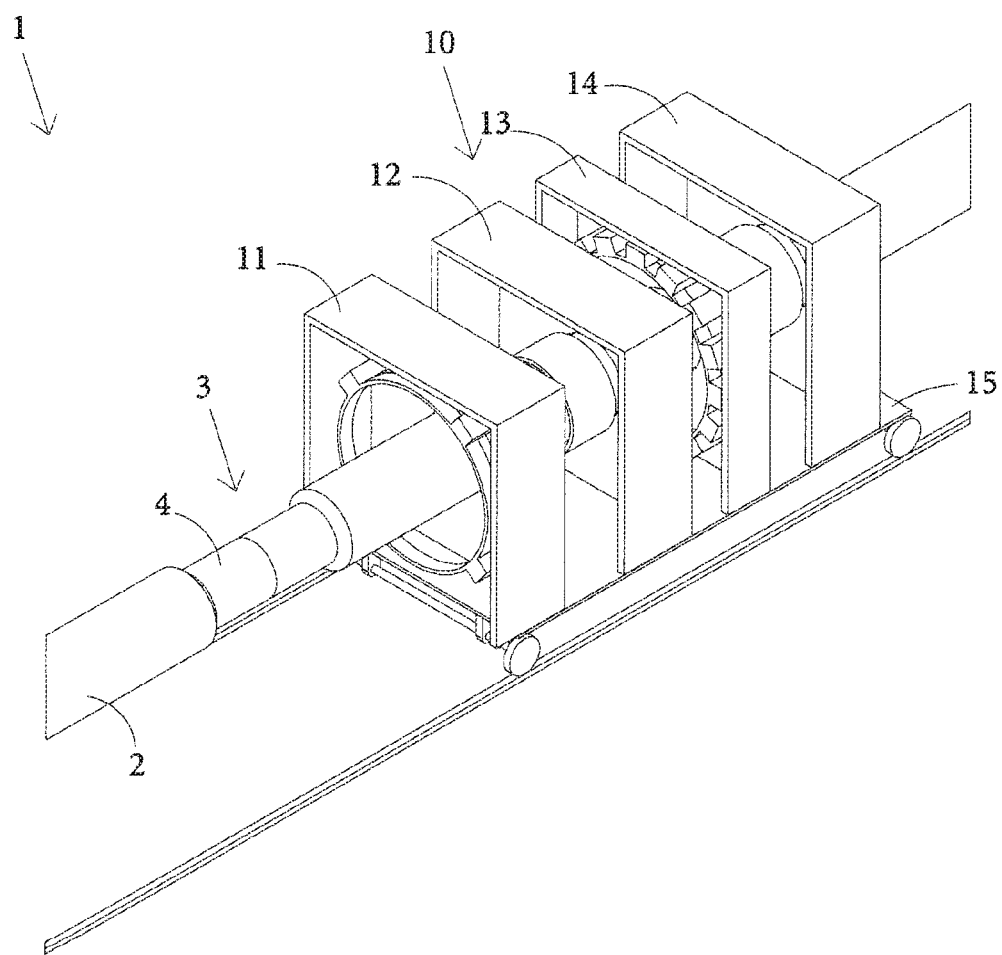
FIG. 2 shows an embodiment of an assembly for producing a coating in a girth-welding process on a coupling section of a pipe.
Figure 3:
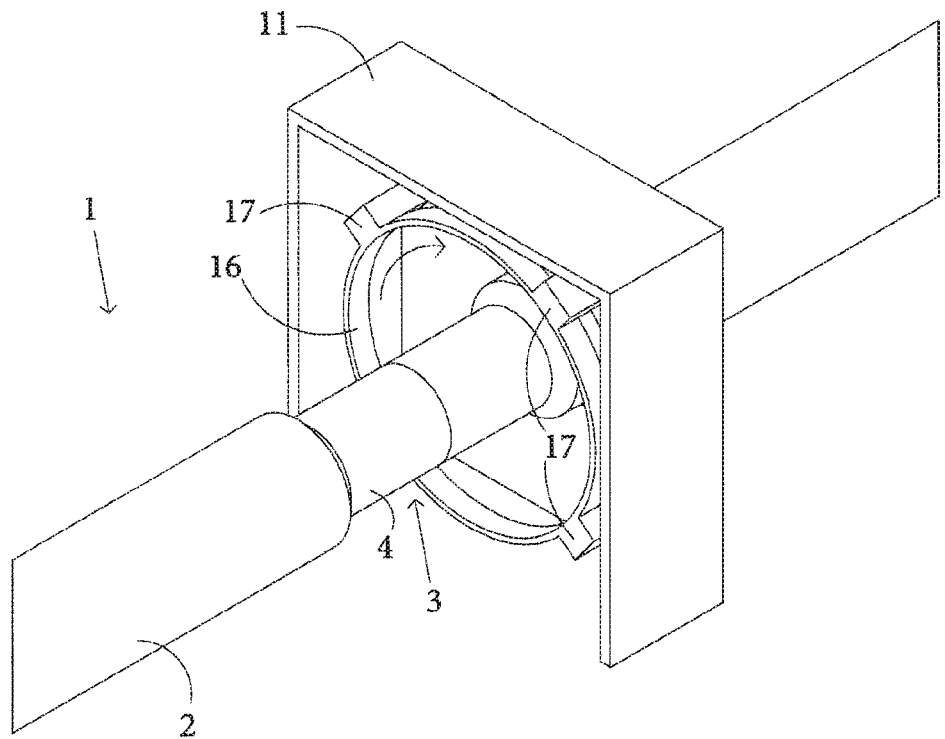
FIG. 3 shows an embodiment of a surface-processing device of the assembly of FIG. 2.

In FIG. 2, an example of processing assembly 10, in particular a field joint coating assembly 10 for making at least part of a field joint coating, is shown. The assembly 10 in the current example houses various devices 11-14 for one or more of the process steps that are required for making a field joint coating. The assembly 10 may comprise one or more of these devices. These devices will be discussed in the FIGS. 3-5. These devices include a surface-processing device 11, a first coating device 12, a surface-heating device 13, and a second coating device 14. Additionally, the assembly comprises a data processing system or computer system (not shown) that is functionally coupled to said devices for control and data retrieval and storage. The computer system or data processor may be part of a larger computer system that comprises remote devices or systems.

In the depicted example of FIG. 2, the assembly is movable in longitudinal direction along a pipeline. In an alternative embodiment, the assembly 10 can be stationary and the pipeline can move in its longitudinal direction.

The assembly 10 in the depicted embodiment comprises a displacement system. In the embodiment, the displacement system comprises a wheeled platform 15 which is here provided on a track. Alternative displacement systems may be used. In an embodiment, the assembly may comprise a displacement system that is supported by the pipeline and which engages the pipeline for the displacement. For instance, wheels can be provided at a distance from the various devices 11-14.

The assembly 10 can be used for providing a coating when pipe sections that are (already) provided with a coating system 2 are welded together. The assembly 10 can also apply a coating system 2 after a repair has been made on a section of a pipeline.

The assembly 10 comprises a surface-processing device 11 for processing a metal surface 4 of a pipeline section 3 that is free or substantially free from the coating system 2.

The surface-processing device 11 comprises a ring 16 about the pipeline, that is substantially aligned with the rotational axis and/or longitudinal direction of the pipeline or at least of the pipeline section 3 onto which the coating system 2 has to be applied.

On the ring 16, one or more laser ablation devices 17 are mounted. The one or more laser ablation devices 17 are directed radially with respect to the pipeline and toward the metal surface 4. In an embodiment, one ablation laser device 17 is mounted rotationally on said ring 16, or alternatively one or more ablation device 17 is/are fixed to the ring 16, and the ring 16 is mounted rotatably on said surface-processing device 11.

In addition to the one or more laser devices 17, one or more sensors may be mounted for recording and/or measuring the performance of the surface-processing device 11. For instance, one or more infrared cameras may be included. Furthermore, a sensor may be included that records or measures the status and/or performance of the one or more laser device 17. The surface-processing device 11 may further comprise an actuator for actuating said ring 16 and/or said one or more laser devices 17.

Figure 4:
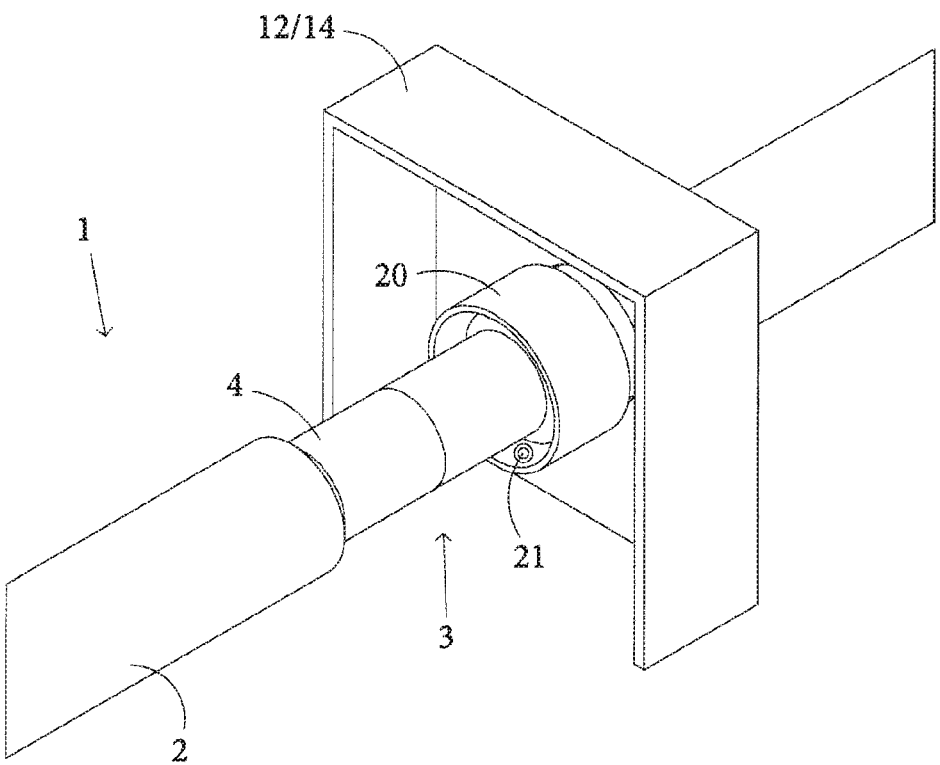
FIG. 4 shows an embodiment of a surface-heating device of the assembly of FIG. 2.

Next, in FIG. 4 the first coating device 12 is provided, which also on the assembly 10 is the next. Here, the first coating device is adapted for applying a multi-component coating composition, for instance for forming a fusion bonded epoxy. Thus, usually an epoxy-functional component and an epoxy-reactive component are mixed and applied. In the embodiment illustrated, a ring 20 is provided with one ore more spray-heads directed internally for applying a uniform coating layer on the section of pipeline. By providing the spray heads inside a ring 20, overspray can be limited if not completely avoided.

Figure 5:
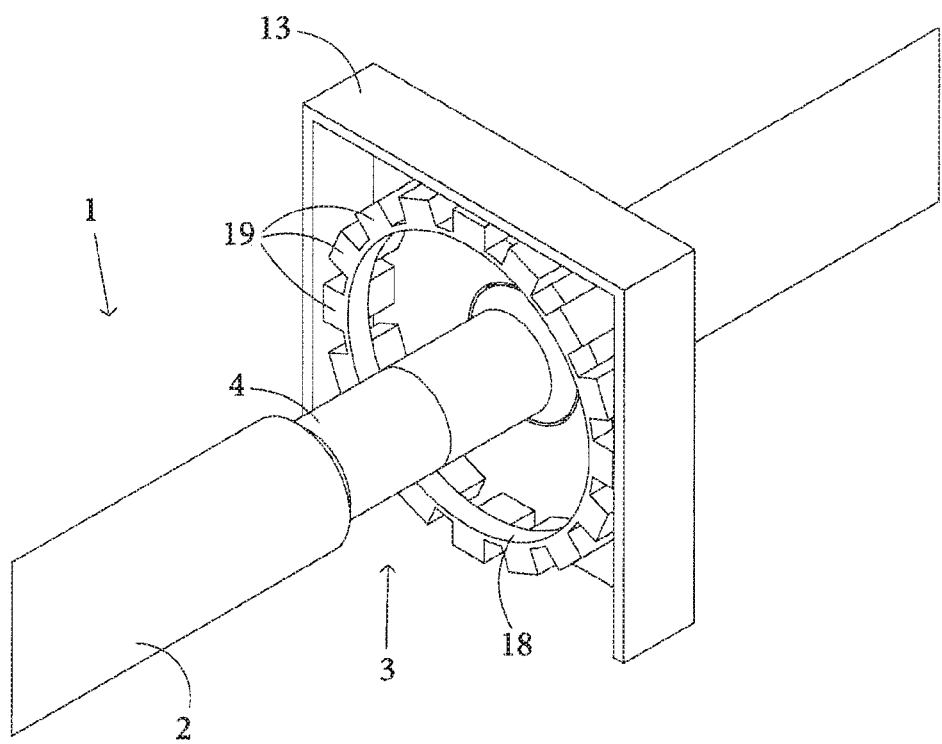
FIG. 5 shows an embodiment of a coating device of the assembly of FIG. 2.

Next, a surface-heating device 13 is provided, see FIG. 5 for more details. The surface-heating device 13 comprises in the current embodiment a ring 18 having one or more heating modules 19 mounted on it. The heating modules 19 are mounted for illumination part of the coupling section 3. The one or more heating modules 19 are provided for providing a homogeneous illumination of at least a ring section of the coupling section 3. In the illustrated embodiment, a series of heating modules 19 is provided equidistantially spaced on said ring 18. The heating modules 19 and the infrared radiation laser sources are aligned in such a way that a ring section of the coupling section is homogeneously illuminated.

The surface-heating device 13 may further comprise one or more sensors for measuring and/or recording one or more process parameters of the surface-heating device and/or of the surface-heating result. For instance, one of more infrared cameras may be installed for imaging the heated surface.

On the assembly 10, furthermore the second coating device 14 is provided. This coating device 14 is not separately illustrated. The second coating device 14 is provided for application of one-component coating compositions, in particular one polymer-component coating compositions. In an embodiment, a powder coating spray device is included. As explained earlier, an example of such a coating composition is CMPP, chemically modified polypropylene. The composition is melted and then sprayed, or it can be applied as a powder coating composition. The second coating device 14 like the first coating device 12 comprises a ring, having one or more spray nozzles provided on the inner surface of said ring. The ring may be adapted to rotate about its axis. Alternatively or in combination, the one or more spray nozzles may de allowed to travel about the inner surface of the ring. Again, the ring can prevent of reduce overspray.

In an embodiment, a material layer, in particular a polymer layer, more in particular comprising an insulating layer, is applied to said pipe section as segments that together provide a continuous layer about said pipe section.

The assembly further comprises a segment application device (not shown) for applying said segments on said pipe section. In an embodiment, said segment application device comprises a segment heating device for heating an inner surface of said segments before application. Said segment heating device may comprise at least one heating module that is similar to said heating modules of said surface-heating device 13. In an embodiment, one or more of said heating modules are positioned forming a ring and in use radiating radially away from said ring.

The segment applicator is provided for applying the segments onto a heated coating layer of said pipe segment end pressing it onto the heated coating layer for proper bonding.

In the current assembly 10, the first coating device 12 is provided between the surface-processing device 11 and the surface-heating device 13. The second coating device 14 is provided at the opposite side of the surface-heating device 13. This may increase processing speed: the assembly 10 can first pass over the pipeline section 3 in one direction for surface processing. Next, the assembly 10 passes to the opposite direction with the surface-heating device 13 activated for heating the processed surface 4. Next, the assembly moves to the opposite direction for applying a first coating layer 5 using the first coating device 12. In a subsequent pass in again opposite direction (longitudinally), the surface-heating device way again be actuated for heating the coated surface. Next, direction of motion is again reversed and using the second coating device 14, a second coating layer is applied.

In an embodiment, one or more of the devices 11-14 of the assembly may be displaceable in longitudinal direction with respect to one another. To that end, the devices mounted on a common frame may comprise one or more displacement actuators for mutually displacing one or more of the devices 11-14 in longitudinal direction.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

The invention claimed is:

1. A field joint coating assembly for making a field joint on a pipe section for a pipeline, said field joint coating assembly having a longitudinal axis which in use functionally coincides with a rotational axis of said pipe section, said field joint coating assembly comprising:
   a surface-processing device for ablating a pipe surface of said pipe section, said surface-processing device comprising at least one laser ablation module, said laser ablation module comprising at least one laser ablation device arranged for in use projecting at least one ablation beam at said longitudinal axis for in use ablating the pipe surface of said pipe section;
   a surface-heating device for heating a surface, said surface-heating device comprising at least one heating module, said heating module comprising at least one infrared (IR) radiation laser device, said surface-heating device arranged for projecting a beam of said at least one infrared (IR) radiation laser device at said longitudinal axis for in use heating a ring-section of the pipe surface of said pipe section, said at least one heating module provided as a healing ring around said longitudinal axis; and
   a coating device for coating a surface, said coating device comprising at least one coating application module, said coating application module comprising at least one coating applicator arranged for providing coating composition in direction of said longitudinal axis, said coating device arranged for homogeneous coating of the ring-section of the pipe surface of said pipe section, wherein said coating applicator comprises at least one spray nozzle arranged for spraying to said longitudinal axis, wherein said coating device comprises a coating ring having an axis coinciding with said longitudinal axis, said coating ring comprising said at least one coating applicator on an inner surface of said coating ring, said coating ring having a diameter for a pipeline having a diameter of 0.3-1.5 meter.

2. The field joint coating assembly of claim 1, wherein said heating device comprises a series of said heating modules, positioned around said longitudinal axis and functionally forming the heating ring around said longitudinal axis, and with their at least one infrared (IR) radiation laser devices arranged for projecting their beams at said longitudinal axis.

3. The field joint coating assembly of claim 1, wherein each of said at least one heating module comprises a series of infrared (IR) radiation laser devices, directed for projecting their beam at said longitudinal axis.

4. The field joint coating assembly of claim 1, wherein said heating device comprises a heating device actuator for rotating said at least heating module about said longitudinal axis while said beam of said at least one infrared (IR) radiation laser device remains directed to said longitudinal axis, and wherein said heating device actuator is adaptable and/or controllable for setting a rotational speed for providing a predefined heating temperature and a homogeneous surface heating.

5. The field joint coating assembly of claim 1, wherein said heating device is adapted for allowing changing the number of heating modules for adapting a circumference of said heating ring setup of said heating modules about said longitudinal axis, for adapting said surface heating device to a diameter of a pipe section to be heated; or said assembly further comprising an assembly actuator for advancing said heating device along its longitudinal axis, in use longitudinally along said pipe section, wherein said assembly actuator is controllable for controlling a heating temperature of said surface.

6. The field coating assembly of claim 1, wherein said infrared radiation laser device comprises a series of semiconductor light sources, and wherein said semiconductor light sources comprise a series of vertical cavity surface emitting lasers.

7. The field joint coating assembly of claim 1, wherein said at least one infrared (IR) radiation laser device transmits in an infrared wavelength range of between 800 and 1300 nm.

8. The field joint coating assembly of claim 1, further comprising a control device for controlling an output of said at least one infrared (IR) radiation laser device in each of said heating module for controlling said surface heating.

9. The field joint coating assembly of claim 8, wherein said control device is functionally coupled to an optical sensor system for in use receiving information regarding said heated surface, and said control system is further adapted for controlling said infrared (IR) radiation laser device in response to said sensor information.

10. The field joint coating assembly of claim 1, further comprising at least one sensor system for sensing said heated surface, the sensor system comprising an optical sensor and an optical recording system, wherein the optical sensor comprises at least one camera system, for recording an image of at least part of said pipe section surface during said heating of said surface.

11. The field joint coating assembly of claim 1, wherein said surface-processing device comprises a surface-processing actuator for rotating said at least one laser ablation device while maintaining it positioned with its ablation beam directed to said longitudinal axis.

12. The field joint coating assembly of claim 1, wherein said at least one laser ablation device comprises a focus actuator configured for setting a focus as a preselected distance from said longitudinal axis, and for adapting said surface-processing device to a diameter of said pipe section.

13. The field joint coating assembly of claim 1, wherein said coating device comprises a coating actuator for advancing said at least one coating applicator around said longitudinal axis while maintaining it directed to said longitudinal axis, or wherein said coating device comprises a coating actuator for rotating said coating ring about said longitudinal axis.

14. The field joint coating assembly of claim 1, wherein said coating device is positioned adjacent said surface heating device.

15. The field joint coating assembly of claim 1, wherein a travel speed of the surface-processing device or the surface-heating device with respect to the pipeline is at least 1 meter/minute.

16. The field joint coating assembly of claim 1, wherein the laser ablation device of the surface-processing device and/or the at least one infrared (IR) radiation laser device of the surface-heating device provide control of surface preparation and/or surface heating sufficient to allow certification of each field joint processing step and of the complete process.

17. The field joint coating assembly of claim 1, wherein one or more of the surface-processing device, the surface-heating device, and the coating device are displaceable in longitudinal direction with respect to one another or along the pipeline.

18. A method for making a field joint on a pipe section for a pipeline with a field joint coating assembly having a longitudinal axis which in use functionally coincides with a rotational axis of said pipe section, said field joint coating assembly comprising:
  a surface-processing device for ablating a pipe surface of said pipe section, said surface-processing device comprising at least one laser ablation module, said laser ablation module comprising at least one laser ablation device arranged for in use projecting at least one ablation beam at said longitudinal axis for in use ablating the pipe surface of said pipe section;
  a surface-heating device for heating a surface, said surface-heating device comprising at least one heating module, said heating module comprising at least one infrared (IR) radiation laser device, said surface-heating device arranged for projecting a beam of said at least one infrared (IR) radiation laser device at said longitudinal axis for in use heating a ring-section of the pipe surface of said pipe section, said at least one heating module provided as a healing ring around said longitudinal axis; and
  a coating device for coating a surface, said coating device comprising at least one coating application module, said coating application module comprising at least one coating applicator arranged for providing coating composition in direction of said longitudinal axis, said coating device arranged for homogeneous coating of the ring-section of the pipe surface of said pipe section, wherein said coating applicator comprises at least one spray nozzle arranged for spraying to said longitudinal axis, wherein said coating device comprises a coating ring having an axis coinciding with said longitudinal axis, said coating ring comprising said at least one coating applicator on an inner surface of said coating ring, said coating ring having a diameter for a pipeline having a diameter of 0.3-1.5 meter; said method comprising:
  pre-treating, via the surface-processing device, a surface of said pipe section to provide a surface condition using laser ablation;
  heating, via the surface-heating device, a surface of said pipe section using the at least one infrared laser device, and applying, via the coating device, at least one coating composition onto said heated surface.

19. The method of claim 18, wherein said coating layer forms a first coating layer and has an outer surface, and in said method said outer surface is subsequently heated and a second coating layer is applied on said heated outer surface of said first coating layer.

20. The method of claim 18, wherein in said heating said pipe section surface said assembly advances along said pipe section in a first direction from one longitudinal pipe section position to a second longitudinal pipe section position while said heating device heats a pipe section surface between said first and second longitudinal pipe section position, and advances subsequently in a second, opposite direction while said coating device applies a coating layer.

* * * * *